Sept. 21, 1965 R. C. POSH 3,207,549
SEAT SAFETY LOCK
Filed May 14, 1963 2 Sheets-Sheet 1
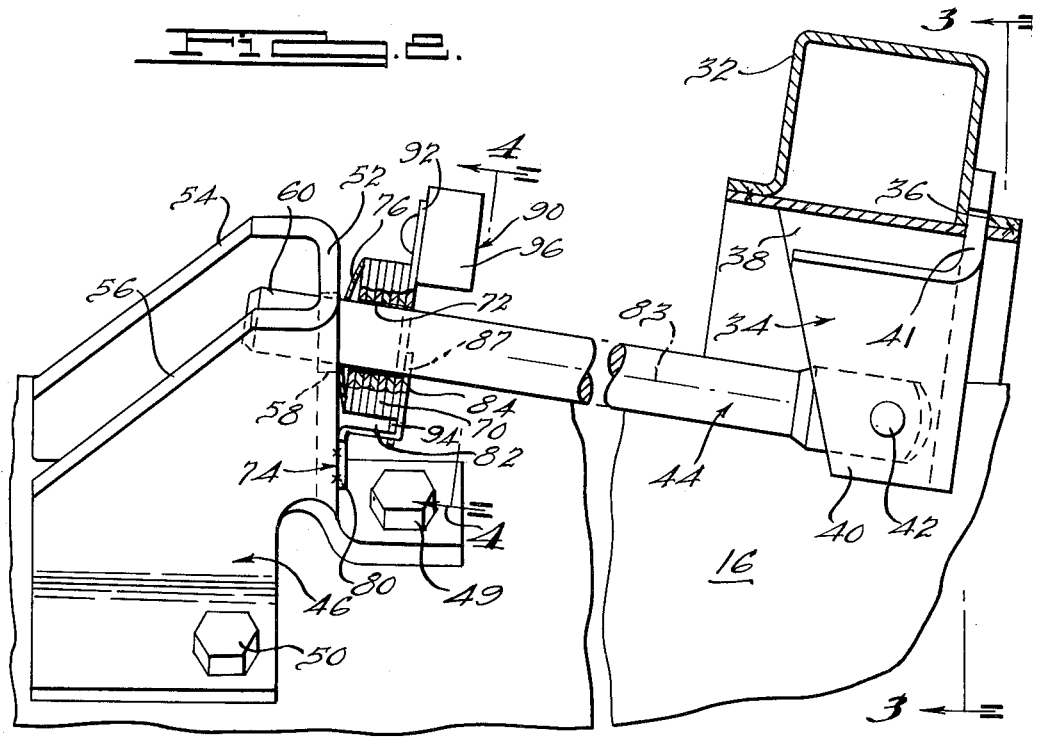
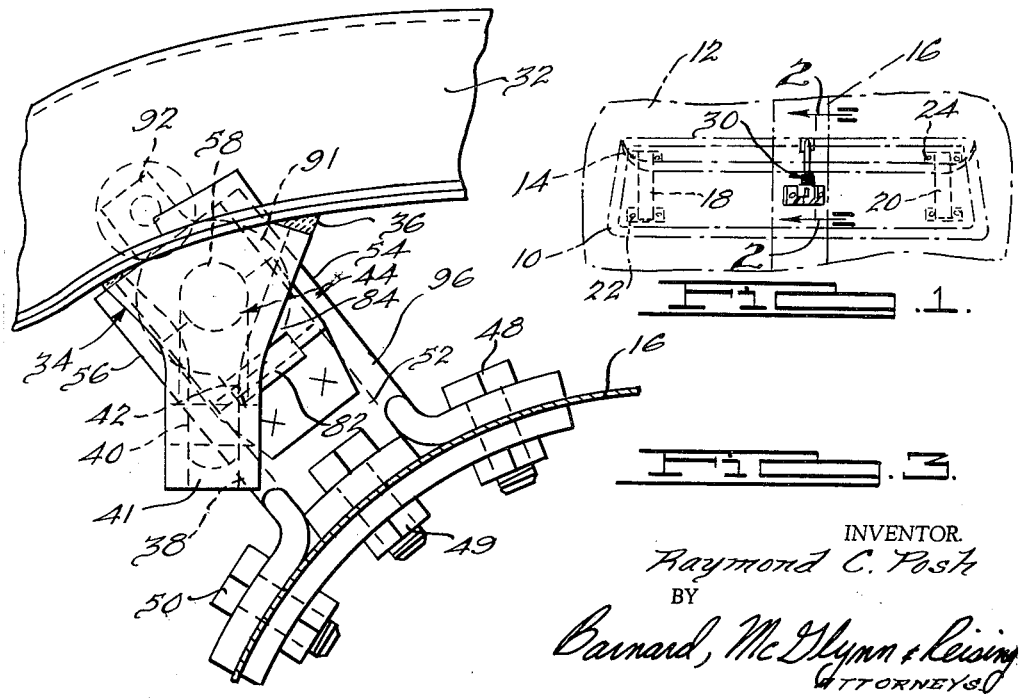
INVENTOR.
Raymond C. Posh
BY
Barnard, McGlynn & Reising
ATTORNEYS

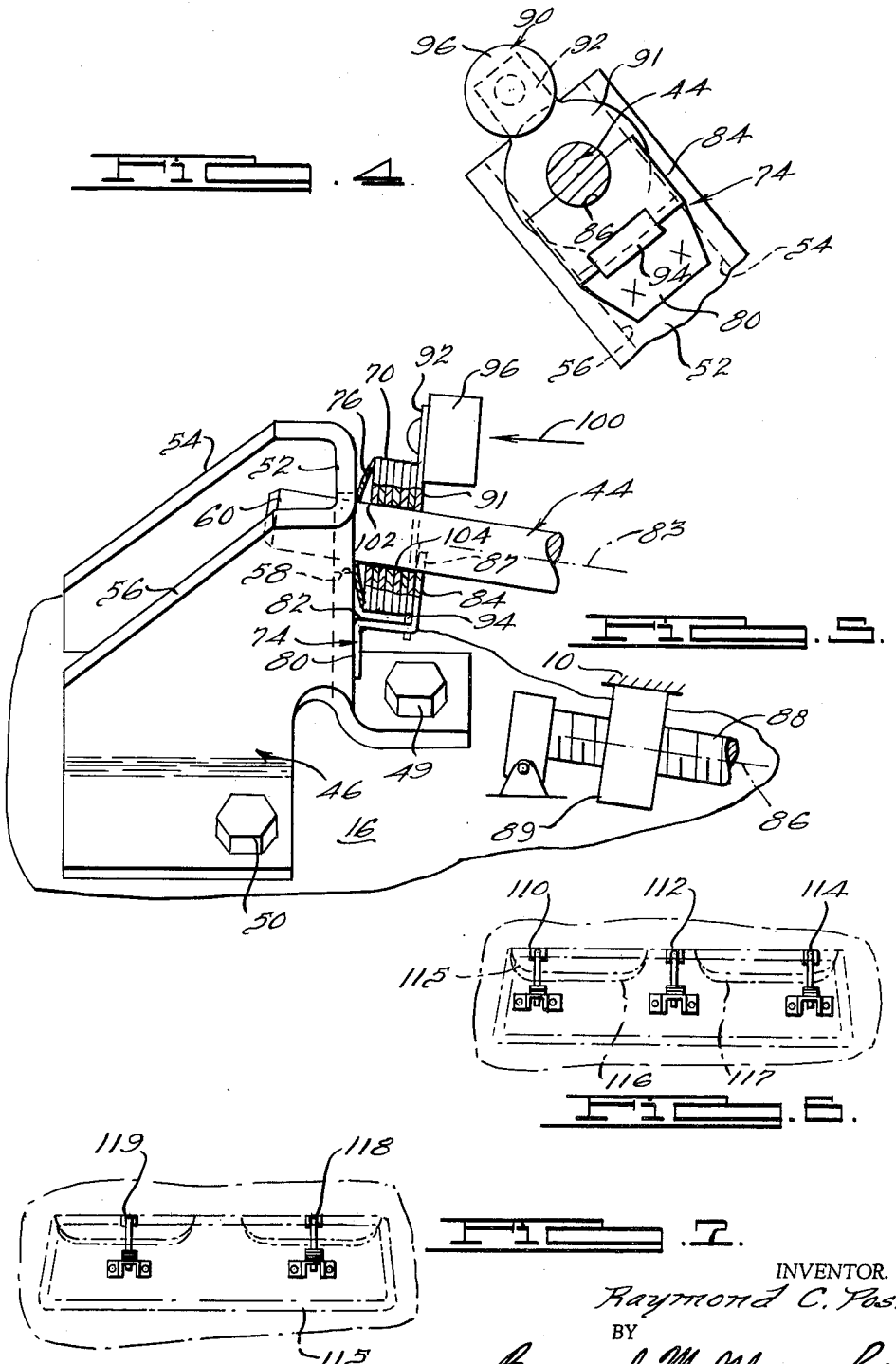

United States Patent Office 3,207,549
Patented Sept. 21, 1965

3,207,549
SEAT SAFETY LOCK
Raymond C. Posh, Garden City, Mich., assignor to American Metal Products, Detroit, Mich., a corporation of Michigan
Filed May 14, 1963, Ser. No. 280,275
14 Claims. (Cl. 296—65)

This invention relates to vehicle seats, and more particularly to safety lock or anchor means operative to prevent accidental displacement of a vehicle seat during periods of rapid deceleration or the like such as in a collision.

Most automobile front seats are conventionally mounted on seat adjuster appartaus for adjustable positioning of the seat to accommodate various driver and seat occupant preferences. In general, the seat adjuster mechanism comprises a lower portion which is fixedly secured to the vehicle floor and an upper portion which is fixedly secured to the seat bottom. The upper and lower portions of the seat adjuster mechanism are relatively movably connected to permit adjustment of the seat relative to the vehicle floor. The upper and lower portions are movably interconnected by a variety of apparatus including ball bearings, slide tracks, jack screws and jack nuts, swinging levers, etc. Consequently, the seat is connected to the vehicle floor through seat adjuster mechanism which is designed to permit movement of the seat relative to the vehicle floor and which, therefore, has inherent limitations as to strength against forces tending to cause uncontrolled movement and/or violent separation of the seat relative to the vehicle floor.

Furthermore, vehicle seats which are mounted for adjustable movement relative to the floor of a vehicle are selectively held in various adjusted positions by relatively low strength apparatus. For example, manually actuable seat adjusters are generally held in any of the adjusted positions by means of a control lever or the like mounted on one portion of the adjuster mechanism and having a flange portion received in locking notches or the like provided on the other portion of the adjuster mechanism. In power operated seat adjusting equipment, the means for holding the seat against inadvertent movement generally is incorporated with and forms part of the actuating mechanism. For example, in one common type of power seat adjuster, the holding means may take the form of jack screw and nut devices which are normally operated by electrical motor means. In any event, under great stress, such as during rapid deceleration of the vehicle and/or collision, the parts designed to provide latches and holding means for the seat adjuster apparatus often fail, permitting the vehicle seat to move relatively freely relative to the vehicle door.

It is the primary object of the present invention to provide new and improved safety seat locking means to prevent accidental movement of a vehicle seat relative to the vehicle floor when vehicle seat adjuser apparatus or other holding means fails.

It is another object of the present invention to provide new and improved seat anchor means operable in response to abnormal conditions to supplement the normal holding forces provided to locate a vehicle seat in a fixed position relative to a vehicle floor.

A further object of the present invention is to provide seat anchor means which positively fix the vehicle seat relative to the vehicle floor under conditions of vehicle deceleration or acceleration; but which also permiit adjustable movement of the vehicle seat by use of conventional seat adjuster apparatus.

Another object of the present invention is to provide an inertia lock for a vehicle seat which is operative from an unlatched position during normal vehicle use to a latched position during changes in motions of the vehicle to positively hold the vehicle seat in place relative to the vehicle floor.

The aforementioned objects, and others, are attained in the present invention by utilization of the inventive principles hereinafter described in detail by reference to the accompanying drawings wherein:

FIGURE 1 is a schematic illustration of vehicle seat apparatus embodying the inventive principles;

FIGURE 2 is a partial side elevational view, partly in section, of a portion of the apparatus shown in FIGURE 1;

FIGURE 3 is a sectional view taken along the line 3—3 in FIGURE 2;

FIGURE 4 is a sectional view taken along the line 4—4 in FIGURE 2;

FIGURE 5 is an enlarged side elevational view of a portion of the apparatus shown in FIGURE 2 in another operational position;

FIGURE 6 is a diagrammatic view of an alternative embodiment of the invention; and FIGURE 7 is another diagrammatic view of another embodiment of the invention.

Referring now to FIGURE 1, a vehicle seat is shown schematically at 10 in position above a vehicle floor 12 or the like. The seat may be of any of the many conventional designs including a seat back 14 which extends substantially the width of the vehicle passenger compartment and the seat, a pair of folding seat backs such as used in two-door sedan construction, bucket seats, etc. A tunnel portion 16 of the vehicle floor 12 is indicated at 16 and is utilized in a particular manner in the preferred embodiment. However, it is to be understood that the apparatus disclosed can also be utilized on other portions of the vehicle floor and without a tunnel portion by mounting directly on a flat portion of the vehicle floor, a side rail, or other structural member of the vehicle. The seat arrangement shown in FIGURE 1 further comprises a pair of conventional spaced seat adjuster units 18–20, which support the vehicle seat 10 and have a portion fixed to the vehicle floor by flanges 22, 24 or the like. The particular type of seat adjuster construction utilized is of no particular significance and may be, for example, a manual two-way type, a manual four or six-way type, or any of the variety of power actuated 2, 4 or 6-way seat adjusters.

The principles of the present invention are embodied in seat holding or anchoring means 30 shown, illustratively, to be located in the center of the seat 10 between the seat bottom and the tunnel portion 16 of the vehicle floor. Referring now to FIGURE 2, a crossbar portion 32 of the seat frame is shown in cross section in spaced relation above the vehicle floor and tunnel. A downwardly extending bracket 34 is fixedly secured to the seat frame 32 in any conventional manner as indicated at 36. The bracket includes a pair of spaced side flanges 38, 40 which extend forwardly from a web or base portion 41 and define supports for a pivot shaft 42. The bracket 34 may be substantially Y-shaped in rear side elevation as shown in FIGURE 3.

A connecting means 44 in the form of a rod is pivotally mounted on the shaft 42 at one end between the flanges 38, 40 and extends forwardly for cooperative association with a bracket 46 mounted on the vehicle floor tunnel 16 by suitable fastening devices 48, 49, 50. The bracket 46 is provided with a central portion which extends upwardly and outwardly at an angle relative to a horizontal plane and is provided with a support wall 52 extending between spaced parallel side wall portions 54, 56.

The support wall portion 52 is provided with receiving means 58 for the connecting means. The end 60, FIG. 2, of the rod 44 is slidably and pivotally received within the rod receiving means 58. The relationship of the rod receiving means 58, which in the preferred embodiment takes the form of a slightly oversized annular aperture, is such that the rod 44 can be slidably moved to and from relative to the support bracket 46 and also pivotally displaced in a vertical plane as the seat is adjusted vertically. The spacing of the bracket 34 relative to the bracket 46 and the slide length of the rod 44 is such that a substantial portion of the end 60 of the rod 44 will always be disposed forwardly of the rod receiving means 58 in all of the adjusted positions of the seat, and further, so that in the forwardmost position of the seat, the bracket 34 and the bracket 46 will be spaced from each other a distance sufficient to prevent any interference between the parts.

Referring now to FIGURES 2, 4 and 5, locking means are provided to fixedly and rigidly secure the rod 44 relative to the bracket 46 during times of maximum stress on the seat unit tending to move the seat relative to the vehicle floor. In other words, during changes in motion of the vehicle and the like, when the inertia of the seat tends to move the seat relative to the vehicle floor, the locking means is operative to positively connect the seat to the vehicle floor and prevent relative movement therebetween. The latching means is particularly adapted for use during periods of rapid acceleration or deceleration of the vehicle such as, for example, during a collision The locking means, in the preferred embodiment, takes the form of a plurality of disc members 70 which are mounted circumjacent the rod 44 by means of centrally located apertures 72 which have a diameter larger than the diameter of the rod. Friction means are provided by the edges of the surfaces of the apertures 72 surrounding the rod 44 for locking engagement with the periphery of the rod when the surfaces are skewed relative to the longitudinal axis 33 as shown in FIG. 5. The disc members are located axially on the rod by means of a bracket 74 at one end and a spring device 76 at the other end which abuts the rear edge of the support wall 52. The bracket 74 is provided with an attaching portion 80 adapted to be suitably secured to the rear surface of the support portion 52 by conventional means such as welding. An intermediate portion 82 of the bracket is bent obliquely and extends rearwardly at an angle substantially parallel to the longitudinal axis 83 of the connecting rod 44 in the normal or most usual range of seat positions. A seat is formed by a slot in the portion 82 adjacent an upwardly bent portion 84 extending substantially at right angles to the portion 82 and to the longitudinal axis 83 of the connecting rod 44 in the usual or normal positions of the rod as determined by the adjusted position of the seat relative to the floor. For example, as shown in FIGURE 5, if a jack screw 88 and a jack nut 89 are provided to adjust a vehicle seat along the longitudinal axis 86, it is desirable to maintain the axis 83 and 86 substantially parallel. The support flange 84 extends upwardly and is provided with a cutout portion 87 which partially surrounds the rod 44.

An inertia operable control means 90 is provided to move the bank of discs from a position permitting movement of the control rod 44 relative to the bracket 46, FIGURE 2, to a position securing the control rod 44 relative to the bracket 46, FIGURE 5. The inertia operable control means 90 comprises a disc member 91 having a radially outwardly extending upper tab 92 and a radially outwardly extending, oppositely located, lower tab 94. The tab 92 extends radially upwardly a sufficient distance to permit a weight 96 to be fixedly secured thereto and to provide a sufficient lever arm to result in pivotal displacement of the disc 91 about the lower end of tab 94 during deceleration of the vehicle. The lower end of tab 94 extends into supporting engagement with the flange portion 82 of the bracket and is pivotally supported thereon for swinging movement of the disc under the inertia effect caused by the weight 96 during rapid changes in movement of the vehicle.

In operation, during normal operation of the vehicle, the discs 70 have a position, such as shown in FIGURE 2, whereat the longitudinal axis of the central apertures 72 substantially coincide with the longitudinal axis 83 of the rod 44 and the adjacent surfaces of the discs circumjacent the rod extend substantially parallel to the outer periphery of the rod. Consequently, the rod 44 can be adjusted longitudinally to and fro without interference between the rod and the disc members 70. The maintenance of coincidence between rod and disc aperture axes is of fundamental importance in all installations. Accordingly in the event a vertically adjustable seat is employed, the angular disposition of rod 44 would be varied in a generally vertical plane. To insure the aforementioned axial coincidence spring seat portion 84 must be maintained at a substantially right angle to rod axis 83. This may be accomplished in any suitable manner whereby the attitude bracket 74 can be adjusted to angular variations on rod 44. One such alternative is to mount bracket 46 upon the vehicle floor for limited pivotal movement with variations in the angle of rod 44. Another alternative would be to mount bracket 74 between floor bracket 46 and rod 44 such that bracket 74 would always be properly oriented to rod axis 83.

Referring now to FIGURE 5, when the vehicle suddenly changes direction or velocity, the inertia control will move in the direction of the arrow 100 and the disc 91 will pivot on the tab 94 causing the disc elements 70 to be inclined relative to the longitudinal axis 83 of the connecting rod 44 so that the surfaces of the apertures 72 are moved from a position substantially parallel to the periphery of the rod to a position inclined relative thereto. Consequently, along a portion of the upper surface of the connecting rod, the forwardmost edges 102 of the discs apertures are moved into frictional biting engagement with the rod; and the rearwardmost edges 104 of the lower portions of the disc apertures are moved into frictional bite engagement with portions of the lower surface of the rod. In this manner the rod is fixedly secured to the bracket 46 and the vehicle seat is securely held relative to the vehicle floor. It may be readily observed that the greater force in the direction of the arrow 100 the greater will be the frictional binding engagement between the control discs and the control rod.

When the motion of the vehicle stops or becomes uniform, the inertia operable control means 90 and discs 70 will be returned to the position substantially at right angles to the rod as shown in FIGURE 2 by the spring 76. As shown in FIGURE 2, weight 96 may be disposed in a rearwardly over-center position from the vertical to facilitate the action of spring 76 in normally maintaining the discs 72 in an unlocked condition. Accordingly, the friction lock is effected only during rapid changes in motion of the vehicle, at those times when the greatest stress is applied tending to separate the seat from the seat floor, and is otherwise inoperative and ineffective and permits the seat to be fully adjustable relative to the vehicle floor with conventional seat adjuster apparatus.

In the preferred embodiment, a single safety anchor means 30 is shown centrally of the seat. An alternative arrangement is shown in FIGURE 6 whereat a series of safety anchor means 110, 112, 114 are placed in spaced relation at the edges of a seat 115 and the center of a seat having separate pivotally mounted seat backs 116, 117. Another arrangement is illustrated in FIGURE 7 whereat safety anchor means 118, 119 are shown spaced equidistant from the ends of the seat 115.

Other alternative arrangements in the placement and in the spacing of the anchor means may be equally well adapted to the inventive principles herein disclosed. Further, the details of construction and design of the anchor means are subject to modification without departing from the inventive principles disclosed. Therefore, it is intended that the appended claims be construed to include

I claim:

1. In combination in a vehicle seat arrangement having seat adjuster means for supporting said seat relative to a vehicle floor for horizontally adjustably positioning of said seat relative to the floor and having selectively releasable locking means associated with the seat adjuster means to lock the seat in a selectively fixed position; the improvement comprising supplemental locking means operably independent from said seat adjuster means to fixedly lock said seat to said floor against horizontal movement in response to changes in motions of the vehicle in the event of failure of said selectively releasable locking means.

2. In a vehicle seat arrangement, a first bracket means fixed to the vehicle seat, a second bracket means immovably fixed to the vehicle floor, connecting means pivotally connected to one of said bracket means and slidably received relative to the second of said bracket means, and locking means engageable with said connecting means to fixedly secure said connecting means relative to said second of said bracket means in response to changes in motion of the vehicle to rigidly secure said seat relative to the vehicle floor and prevent displacement of the seat under stress such as that induced during rapid deceleration of a vehicle.

3. In combination in a vehicle seat arrangement mounted on a vehicle floor or the like and having seat adjusting means for selectively adjusting the seat relative to the vehicle floor and located in spaced relation at the sides of the seat: a downwardly depending bracket secured to said seat centrally of said seat adjusting means, an upwardly extending bracket fixedly mounted on the vehicle floor centrally of said seat adjusting means, rod means extending between said downwardly depending bracket and said upwardly extending bracket, means pivotally securing said rod means relative to said downwardly depending bracket for pivotal movement in a substantially vertical plane and also otherwise fixedly connecting said rod means to said seat, means pivotally securing said rod means relative to said upwardly extending bracket to accommodate pivotal movement of said rod means relative to said downwardly depending bracket and said seat and otherwise slidably supporting said rod means relative to said upwardly extending bracket to permit movement of said seat and said downwardly extending bracket and said rod means relative to said floor and said upwardly extending bracket, said downwardly extending bracket and said upwardly extending bracket being spaced from one another a distance sufficient to enable said seat to be adjusted throughout the adjustment range of said adjuster means, said rod means having a length sufficient to maintain continuous connection between said downwardly depending bracket and said upwardly extending bracket throughout the adjustment range of said adjuster means, said rod means being mounted substantially parallel to the path of movement of said adjuster means, said means pivotally securing and mounting said rod means maintaining said rod means substantially parallel to the path of movement of said adjuster means throughout the adjustment range of said adjuster means, and an inertia lock means mounted on said upwardly extending bracket means and connected to said rod means to lock said rod means to said upwardly extending bracket during changes in motion of the vehicle such as during rapid deceleration to provide a positive anchor between said seat and the floor to prevent movement of said seat relative to said floor in the event that said seat adjustment means fails to hold said seat relative to said floor.

4. The invention as defined in claim 3 and wherein said inertia lock means is movable in the direction of the forces tending to displace said seat relative to said floor whereby the locking force exerted is directly proportional to the displacement force exerted on said seat.

5. The apparatus as defined in claim 3 and wherein said inertia lock means comprises a plurality of disc members having centrally located friction surfaces adapted to receive said rod means, spaced support means for said disc members to limit axial movement thereof relative to said rod means, spring means mounted between one of said support means and said disc members to bias said disc members to an unlocked position extending substantially transversely to the longitudinal axis of said rod means, a disc member control means mounted between said disc members and the other of said support means, and weight means operative in response to changes in motion of the vehicle to actuate said control means and displace said disc members against the bias of said spring means from said unlocked position to a locked position inclined relative to the longitudinal axis of said rod means whereat said friction surfaces are located in frictional engagement with said rod means and fixedly retained between said support means to positively lock said rod means relative to said support means.

6. The invention as defined in claim 5 and wherein said control means comprises a disc member having an outwardly extending lever arm portion, means pivotally mounting said last mentioned disc member relative to said rod means, and said weight means comprises a weight mounted on the end of said lever arm in a position displaced over center from a vertical plane to normally cause pivotal movement of said last mentioned disc member to the unlocked position.

7. In a seat arrangement for a vehicle or the like having a floor with an upwardly raised tunnel portion and spaced seat adjuster mechanism on opposite sides of said tunnel portion for adjustably supporting said seat: the improvement of anchor means mounted centrally of said seat adjuster means to secure said seat means relative to said floor during times when said seat is subject to maximum stress tending to cause movement of said seat relative to said floor and comprising, first bracket means mounted on said tunnel portion, a second bracket means fixedly secured to said seat, rod receiving means provided on each of said bracket means, said rod receiving means being located in substantial longitudinal alignment relative to the longitudinal axis of said vehicle, rod means extending between said bracket means and extending substantially longitudinally of said vehicle, one end of said rod means being pivotally mounted on one of said rod receiving means, the other end of said rod means being slidably and pivotally mounted on the other of said rod receiving means, and inertia operated latch means mounted on said first bracket means adjacent said other of said rod receiving means and adapted to coact with said rod means to fixedly secure said rod means relative to said first bracket means to prevent sliding movement of the rod means relative to the first bracket means during changes in motion of said vehicle.

8. In a vehicle seat arrangement, means for mounting a vehicle seat for selectively controlled adjustable horizontal movement relative to the vehicle floor, a first means for holding said vehicle seat in any selectively adjusted position, and a second means operably independent from said first means for fixedly securing said vehicle seat to the vehicle floor independently of the operation of said first means at times of application of forces to said seat tending to cause uncontrolled movement of said vehicle seat relative to the vehicle floor.

9. The invention as defined in claim 8 and wherein said second means comprises rod means connected to said seat extending substantially parallel to the path of horizontal adjustment of said seat, means rigidly connecting said rod between the vehicle floor and the vehicle seat during said times, said last named means movably connecting said rod between the vehicle floor and the vehicle seat during selectively controlled adjustable movement of said seat.

10. The invention as defined in claim 9 and wherein said rod means comprises a single elongated bar mounted centrally of said seat between said seat and the vehicle floor, and being located at all times beneath said seat.

11. The invention as defined in claim 9 and wherein said rod means comprises a plurality of elongated bars mounted in spaced relationship between said seat and the vehicle floor, and being located at all times beneath said seat.

12. The invention as defined in claim 8 and wherein said second means comprises elongated bar means extending between said seat and the vehicle floor, first bracket means pivotally connecting one end of said bar means to said seat and second bracket means slidably connecting the other end of the bar means to the vehicle floor to permit selectively controlled adjusting movement of said seat relative to the vehicle floor, and clamping means co-acting with said bar means and said second bracket means and operative under predetermined conditions of stress on said seat to rigidly connect said bar means between said seat and the vehicle floor.

13. The invention as defined in claim 12 and wherein said clamping means comprises friction type gripping means movable between a locked position of frictional engagement with said rod means and an unlocked position relative to said rod means, and an inertia control means for moving said friction type gripping means between said locked position and said unlocked position.

14. The invention as defined in claim 13 and wherein said inertia control comprises a lever arm portion pivotally supported upon said second bracket means, a weight means mounted on the end of said lever arm portion, and spring means normally biasing said lever arm portion to maintain the friction type gripping means in the unlocked position, said weight means being inertia actuated to move said lever arm portion against the force of said spring means and moving the friction gripping means to the locked position until the inertia effect becomes less than the force of the spring means.

References Cited by the Examiner
UNITED STATES PATENTS

| | | | |
|---|---|---|---|
| 2,478,304 | 8/49 | Mulsow | 292—306 X |
| 2,737,229 | 3/56 | Semar | 280—150 X |
| 2,915,777 | 12/59 | Allen | 292—386 X |

A. HARRY LEVY, *Primary Examiner.*

KENNETH H. BETTS, *Examiner.*